(12) United States Patent
Schoon (10) Patent No.: US 8,561,732 B2
(45) Date of Patent: Oct. 22, 2013

(54) OFFSET DRIVE SYSTEM FOR UTILITY VEHICLES

(75) Inventor: Benjamin Warren Schoon, Lafayette, IN (US)

(73) Assignee: Fairfield Manufacturing Company, Inc., Lafayette, IN (US)

(*) Notice: Subject to any disclaimer, the term of this patent is extended or adjusted under 35 U.S.C. 154(b) by 4 days.

(21) Appl. No.: 13/153,440

(22) Filed: Jun. 5, 2011

(65) Prior Publication Data

US 2011/0232978 A1 Sep. 29, 2011

Related U.S. Application Data

(62) Division of application No. 11/690,785, filed on Mar. 23, 2007, now Pat. No. 7,954,574.

(51) Int. Cl.
*B62D 11/00* (2006.01)

(52) U.S. Cl.
USPC .......................................... 180/6.5; 180/6.48

(58) Field of Classification Search
USPC .............. 180/6.5, 6.48, 65.6, 24.12, 292, 297
See application file for complete search history.

(56) References Cited

U.S. PATENT DOCUMENTS

| | | | |
|---|---|---|---|
| 1,570,356 A | 1/1926 | Lane | |
| 2,999,555 A * | 9/1961 | Stroud et al. | 180/19.1 |
| 3,168,927 A | 2/1965 | Garner | |
| 3,214,989 A | 11/1965 | Wellauer et al. | |
| 3,385,255 A | 5/1968 | Raymond et al. | |
| 3,635,365 A | 1/1972 | Bauer | |
| 3,767,013 A | 10/1973 | Caldwell | |
| 3,848,702 A | 11/1974 | Bergman | |
| 4,018,097 A | 4/1977 | Ross | |
| 4,031,780 A | 6/1977 | Dolan et al. | |
| 4,050,544 A | 9/1977 | Kalyan et al. | |
| 4,051,922 A | 10/1977 | Sukle | |

(Continued)

FOREIGN PATENT DOCUMENTS

| | | |
|---|---|---|
| DE | 1450724 A1 | 2/1969 |
| EP | 0677672 A1 | 10/1995 |
| FR | 2740853 A1 | 5/1997 |
| JP | 60157593 A | 8/1985 |

OTHER PUBLICATIONS

Inventor: Schoon, U.S. Appl. No. 12/629,204, filed Dec. 2, 2009; Entitled: Integrated Spindle-Carrier Electric Wheel Drive; 8602.

(Continued)

*Primary Examiner* — J. Allen Shriver, II
*Assistant Examiner* — Bridget Avery
(74) *Attorney, Agent, or Firm* — Woodling, Krost and Rust (57) ABSTRACT

A wheel driven utility vehicle includes a frame and two small volume high speed alternating current electric motors arranged side by side for driving the vehicle. Alternatively high speed direct current, hydraulic or pneumatic direct current motors may be used with suitable controls. Each motor has an output shaft which drives an offset planetary gear reducer. Each offset planetary gear reducer is affixed to the electric motor and includes an output carrier interconnected with an output shaft. Each output shaft includes first and second chain drive sprockets which drive chains interconnected with shafts driving the front and rear wheels respectively. Each offset planetary gear reducer enables use of space saving high speed relatively low-torque alternating current electric motors with attendant large speed reductions. Gear reduction enables the production of sufficient torque at the wheels of the vehicle. Applications in addition to utility vehicles are also specifically contemplated.

10 Claims, 8 Drawing Sheets

(56) References Cited

U.S. PATENT DOCUMENTS

| | | |
|---|---|---|
| 4,057,126 A | 11/1977 | Stephens |
| 4,090,588 A | 5/1978 | Willover |
| 4,121,694 A | 10/1978 | Nelson |
| 4,170,549 A | 10/1979 | Johnson |
| 4,210,218 A | 7/1980 | Oswald et al. |
| 4,210,219 A | 7/1980 | Oswald et al. |
| 4,221,279 A | 9/1980 | Jones et al. |
| 4,222,283 A | 9/1980 | Nagy |
| 4,252,203 A | 2/1981 | Oswald et al. |
| 4,327,950 A | 5/1982 | Czuszak |
| 4,359,142 A | 11/1982 | Schultz et al. |
| 4,361,774 A | 11/1982 | Czech |
| 4,407,381 A | 10/1983 | Oswald et al. |
| 4,448,552 A | 5/1984 | White et al. |
| 4,545,332 A | 10/1985 | Suzuki et al. |
| 4,575,311 A | 3/1986 | Wood |
| 4,588,385 A | 5/1986 | Suzuki et al. |
| 4,616,736 A | 10/1986 | Fox |
| 4,683,771 A | 8/1987 | Sogo et al. |
| 4,683,985 A | 8/1987 | Hultgren |
| 4,700,808 A | 10/1987 | Haentjens |
| 4,705,449 A | 11/1987 | Christianson |
| 4,741,303 A | 5/1988 | Kronich |
| 4,762,471 A | 8/1988 | Asanuma et al. |
| 4,763,031 A | 8/1988 | Wang |
| 4,766,859 A | 8/1988 | Miyaki et al. |
| 4,803,897 A | 2/1989 | Reed |
| 4,952,077 A | 8/1990 | Kurt |
| 4,962,821 A | 10/1990 | Kim |
| 4,987,974 A | 1/1991 | Crouch |
| 5,024,636 A | 6/1991 | Phebus et al. |
| 5,161,644 A | 11/1992 | Swenskowski et al. |
| 5,333,704 A | 8/1994 | Hoff |
| 5,340,273 A | 8/1994 | Rockwood |
| 5,453,181 A | 9/1995 | Dahlback et al. |
| 5,478,290 A | 12/1995 | Buuck et al. |
| 5,480,003 A | 1/1996 | Hill et al. |
| 5,489,013 A | 2/1996 | Buuck et al. |
| 5,505,112 A | 4/1996 | Gee |
| 5,558,180 A | 9/1996 | Yahagisawa |
| 5,582,263 A * | 12/1996 | Varma et al. ............ 180/247 |
| 5,591,018 A | 1/1997 | Takeuchi et al. |
| 5,601,155 A | 2/1997 | Gardner |
| 5,616,097 A | 4/1997 | Dammon |
| 5,630,481 A | 5/1997 | Rivard |
| 5,634,530 A | 6/1997 | Maekawa et al. |
| 5,662,188 A | 9/1997 | Ito et al. |
| 5,667,036 A | 9/1997 | Mueller et al. |
| 5,699,877 A | 12/1997 | Dreier |
| 5,725,072 A | 3/1998 | Yamamoto et al. |
| 5,768,954 A | 6/1998 | Grabherr et al. |
| 5,810,116 A | 9/1998 | Kaptrosky |
| 5,860,403 A | 1/1999 | Hirano et al. |
| 5,887,678 A | 3/1999 | Lavender |
| 5,947,075 A | 9/1999 | Ryu et al. |
| 6,106,254 A | 8/2000 | Hirooka et al. |
| 6,139,295 A | 10/2000 | Utter et al. |
| 6,146,118 A | 11/2000 | Haller et al. |
| 6,213,078 B1 | 4/2001 | Ryu et al. |
| 6,213,081 B1 | 4/2001 | Ryu et al. |
| 6,223,858 B1 | 5/2001 | Ubagai et al. |
| 6,244,386 B1 | 6/2001 | Takasaki et al. |
| 6,267,196 B1 * | 7/2001 | Wilcox et al. ............ 180/347 |
| 6,276,474 B1 | 8/2001 | Ruppert |
| 6,327,994 B1 | 12/2001 | Labrador |
| 6,328,123 B1 | 12/2001 | Niemann |
| 6,374,951 B1 | 4/2002 | Michelhaugh |
| 6,394,061 B2 | 5/2002 | Ryu et al. |
| 6,439,208 B1 | 8/2002 | Jones |
| 6,488,110 B2 | 12/2002 | Price |
| 6,516,789 B1 | 2/2003 | Jones |
| 6,588,539 B2 | 7/2003 | Hinton et al. |
| 6,616,432 B2 | 9/2003 | Sczcepanski et al. |
| 6,616,567 B2 | 9/2003 | Strong et al. |
| 6,698,762 B2 | 3/2004 | Newberg et al. |
| 6,702,703 B2 | 3/2004 | Gervais, III et al. |
| 6,705,555 B1 | 3/2004 | Bratten |
| 6,742,482 B2 | 6/2004 | Artola |
| 6,810,849 B1 | 11/2004 | Hirsch et al. |
| 6,852,061 B2 | 2/2005 | Schoon |
| 6,863,043 B2 | 3/2005 | Kurihara et al. |
| 6,964,313 B2 | 11/2005 | Phillips, III et al. |
| 2,725,510 A1 | 12/2005 | Oates |
| 6,997,841 B2 | 2/2006 | Wagle et al. |
| 7,198,582 B2 | 4/2007 | Miller et al. |
| 7,232,000 B2 | 6/2007 | Brossard |
| 7,243,749 B2 | 7/2007 | Kakinami et al. |
| 7,331,423 B2 | 2/2008 | Inoue et al. |
| 7,396,209 B2 | 7/2008 | Miller et al. |
| 7,455,616 B2 | 11/2008 | Beltkowski |
| 7,622,836 B2 | 11/2009 | Deveny et al. |
| 7,866,444 B2 | 1/2011 | Aldridge |
| 8,056,662 B2 | 11/2011 | Schoon et al. |
| 8,133,143 B2 | 3/2012 | Schoon |
| 2005/0272551 A1 | 12/2005 | Oates |
| 2006/0219447 A1 * | 10/2006 | Saitou et al. ............ 180/65.2 |
| 2007/0295557 A1 | 12/2007 | Aldridge |
| 2008/0230289 A1 | 9/2008 | Schoon |

OTHER PUBLICATIONS

Schoon, PCT/US2008/056337, International Search Report, June 9, 2009.

General Electric EV-1, B, C, D Manual, Copyright 1990 Flight Systems.

European Search Report, EP 1 843 056 A3, Application No. EP 06 01 9821, Dec. 12, 2008 Munich.

Imperial Electric Offset Gearbox Frame 66, Copyright 2004.

* cited by examiner

```
┌─────────────────────────────────────┐
│  ORIENTING AND MOUNTING (TO THE     │
│  VEHICLE) TWO HIGH-SPEED ELECTRIC   │
│  MOTORS SIDE BY SIDE WITH           │
│  OPPOSITELY ORIENTED SHAFT          │
│  MOUNTED PINION GEARS               │
│                               301   │
└─────────────────────────────────────┘
                  │
┌─────────────────────────────────────┐
│  MOUNTING OFFSET PLANETARY GEAR     │
│  REDUCERS IN ENGAGEMENT WITH THE    │
│  SHAFT DRIVEN PINION GEARS          │
│                               302   │
└─────────────────────────────────────┘
                  │
┌─────────────────────────────────────┐
│  COUPLING AN OUTPUT SHAFT TO THE    │
│  SPLINED OUTPUT OF THE CARRIER      │
│                               303   │
└─────────────────────────────────────┘
                  │
┌─────────────────────────────────────┐
│  DRIVING THE WHEEL SHAFTS OF THE    │
│  VEHICLE                            │
│                               304   │
└─────────────────────────────────────┘
```

FIG. 3

OFFSET DRIVE SYSTEM FOR UTILITY VEHICLES

This is a divisional patent application Ser. No. 11/690,785 filed Mar. 23, 2007 which is copending. This divisional patent application claims priority to and of patent application Ser. No. 11/690,785 filed Mar. 23, 2007.

FIELD OF THE INVENTION

The invention is in the field of offset drive systems for utility vehicles. In particular, this invention is in the field of utility vehicles (such as Skid-Steer® and Bobcat® vehicles), fork lifts and front end loader machines.

BACKGROUND OF THE INVENTION

Traditionally, Skid-Steer® Loader Machines as made famous by manufacturers such as Bobcat® and the like have been powered almost exclusively by hydraulics. Skid-Steer® is a registered trademark of Arts-way Manufacturing Co., Inc., a Delaware Corporation. Bobcat® is a registered trademark of Clark Equipment Company of New Jersey.

These machines traditionally have gasoline or diesel internal combustion engines that drive a hydraulic pump. The pump usually provides power to two independently controlled hydraulic motors one for each side of the machine. The output of each motor drives a drive sprocket with two sets of sprocket teeth. One set of sprocket teeth drives a chain that goes to a front wheel sprocket and the other set of sprocket teeth drives a chain that goes to the rear wheel sprocket. The hydraulic pump also provides power for lifting functions and power takeoffs for implements that can be connected to the machine.

Figure 1:
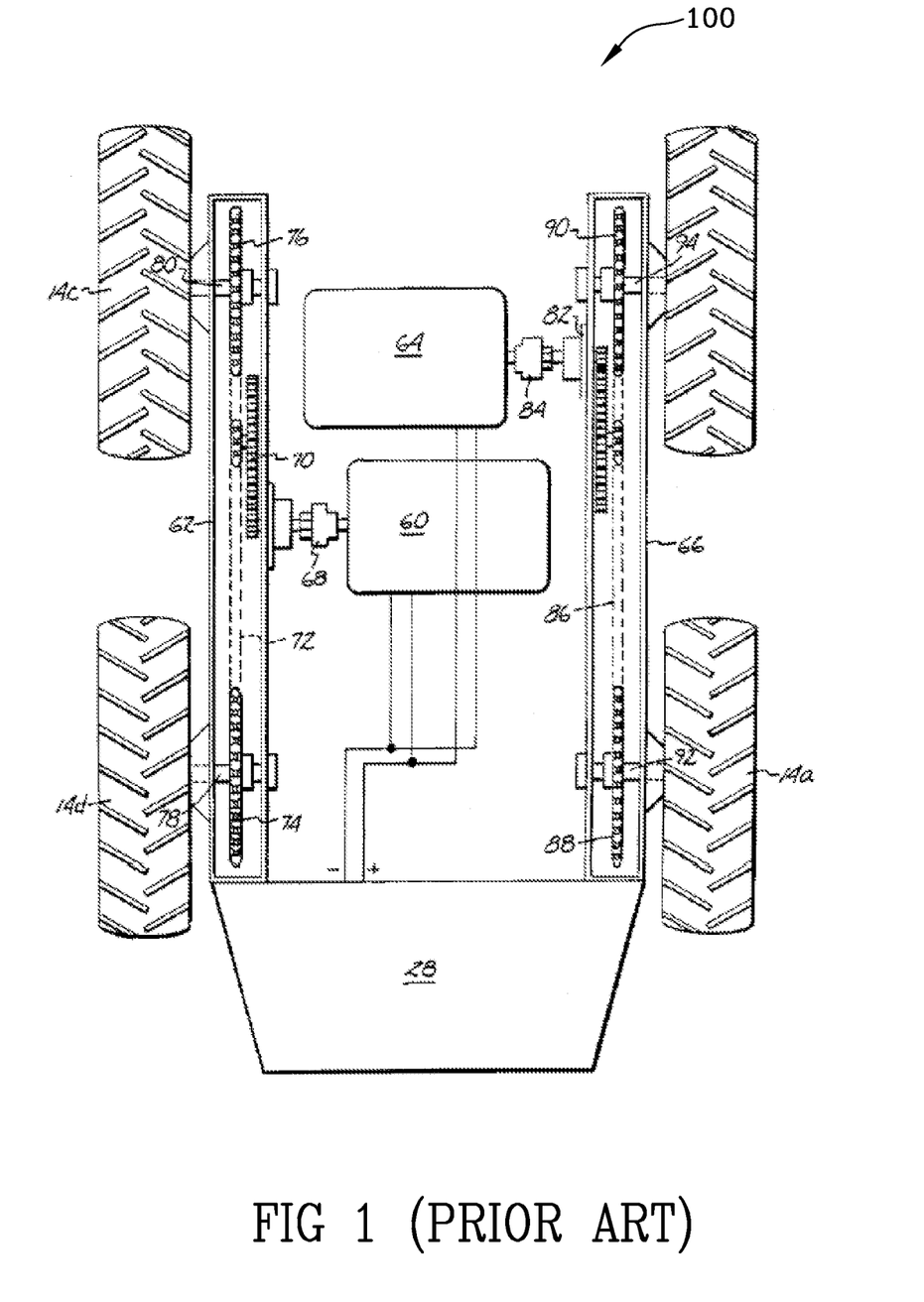
FIG. 1 is a plan view of a prior art Skid-Steer vehicle powered by two DC traction motors.

U.S. Pat. No. 4,705,449 to Christianson et al. discloses the use of two electric traction motors. FIG. 1 is a plan view of an electric drive system of U.S. Pat. No. 4,705,449 to Christianson et al. wherein battery 28 supplies electric power to two traction motors 60, 64 which in turn are coupled 84 to a gear reducer 82. Specifically, the '449 patent states at col. 4 line 10 et seq.: "a first traction motor 60 provides the motive force for the left-hand side of the vehicle and a second traction motor 64 provides the motive force for a right-hand side of the vehicle 66. Both the first traction motor 60 and the second traction motor 64 are powered by a battery pack 28 . . . . Similarly, the traction motor 64 is connected to a spur gear reduction assembly 82 through a coupling 84. The spur gear reduction assembly engages a chain 86 which in turn engages a right rearward gear 74 and left forward gear 90, which are respectively connected to wheels 14a and 14b through axles 92 and 94. As will be appreciated, the traction motor 60 is operated independently of the traction motor 64 thereby permitting the wheels 14c, 14d to operate at different speed than wheels 14a and 14b to create skid steering.".

U.S. Pat. No. 4,705,449 to Christianson et al. discloses the use of two electric traction motors. The motors are not identified by type in Christianson et al as either DC or AC. However, the motors are DC electric motors as they are controlled by a device identified in the '449 patent to Christianson, namely, a General Electric EV 1 SCR Controller, which is designed to control DC motors. The General Electric EV 1 SCR Controller describes the use of rectifiers to pulse power to DC motors and has no provision for the control of AC motors.

A copy of the EV 1 SCR Controller technical literature is submitted herewith in an Information Disclosure Statement and describes the use of the controller as being for the control of DC motors. Additionally, the EV 1 SCR Controller is identified in U.S. Pat. No. 4,265,337 to Dammeyer entitled Fork Lift Truck Speed Control Upon Fork Elevation and is used to control a DC motor 92.

Additionally, the EV 1 SCR Controller has been used in numerous automobiles (electric vehicles) in conjunction with DC series wound motors which provide high current and high torque at low rpm.

DC traction motors have been used in applications involving forklifts and similar vehicles in the past. Internal combustion engines are not favored in such applications because an internal combustion engine produces zero torque at zero engine speed (RPM) and reaches its torque peak later in its operating range. Internal combustion engines generally require a variable-ratio transmission between the engine and the wheels to match engine speed to the road speeds and loads encountered. A clutch must be provided so that the engine can be mechanically decoupled from the wheels when the vehicle stops. Additionally, some slippage of the engine with respect to the drive train occurs while starting from a stop. Direct current electric traction motors produce considerable torque at zero RPM and thus may be connected directly to the wheels. Alternating current motors, hydraulic motors and pneumatic motors also produce torque at zero RPM.

Although the term traction motor is usually referred to in the context of a direct current motor, the term is also applicable to alternating current motor applications as well. Additionally, the term traction motor is used to describe any motor of whatever type used to supply torque and power to a vehicle's wheel, tracks, etc.

In small utility vehicles and the like, space is an important consideration in the design of the vehicle. It is therefore desirable to use a small motor, electric, hydraulic, or pneumatic which is capable of supplying required torque and horsepower under all operating conditions. If an electric motor is used it may be an alternating current motor or it may be a direct current motor.

Generally, for a given power, high speed electric motors are smaller in size, lighter in weight, and less expensive than low speed motors. Generally, for a given power, alternating current motors are smaller than direct current motors.

Therefore, it is highly desirable to save space, weight and cost in the powertrain of a utility vehicle through the use of a high speed motor so that the space may be used for batteries, controls or other components.

SUMMARY OF THE INVENTION

As electric motor technology has advanced to provide more performance for less cost it makes sense to replace hydraulic systems with electric systems. Electric motors typically rotate at much higher RPM than hydraulic motors, particularly those suitable for skid-steer loaders. It is desirable to minimize the size of the drive train components so as to maximize the space available for batteries and controls. The vehicle described herein may employ Nickel Metal Hydride, Lithium Ion, Lithium Ion polymer, lead acid batteries or other battery technology.

Although one example of the invention as described herein uses high speed alternating current electric motors it is specifically contemplated that the invention may be used with high speed direct current electric motors, high speed hydraulic motors and high speed pneumatic motors.

The input to the gear box is an offset helical gear driven by a pinion. A planetary sun pinion inputs to the planetary stage. Planetary gear sets provide torque multiplication in compact packages. The output of the gear box is a carrier with a planetary gear-set reduction including a stationary ring gear. The gear box casing includes a ring gear which is a reaction gear and intermeshes with a three-gear planetary set. The carrier of the planetary gear set includes a spline which intermeshes with a splined output shaft.

The offset reduction in the gearbox is an important aspect of the invention as it enables the electric motors to be placed side to side. Use of electric motors is enabled in this application by offsetting the gear box. In this way the left and right side motors can be mounted side-by-side without interference while still maximizing available space for other components such as batteries and controls.

In another example, the offset gear box may be oriented differently (i.e., rotated 180 degrees) with the motors side by side. Although this example may result in reducing the width of the vehicle it may also result in increasing the length of the vehicle. Still alternatively, this example may be used to drive one of the wheel shafts directly.

A wheel driven utility vehicle includes a frame and two high speed alternating current electric motors arranged side by side for driving the vehicle. A variable frequency alternating current drive is utilized to control the speed of the motors and hence to control the direction and turning of the utility vehicle. Instead of high speed alternating current motors, high speed direct current motors, high speed hydraulic motors and/or high speed pneumatic motors may be used.

Each alternating current motor has an output which drives an offset planetary gear reducer. Each offset planetary gear reducer is affixed to the electric motor (or other motor type) and includes an output carrier interconnected with an output shaft. Each output shaft includes first and second chain drive sprockets which drive chains interconnected with shafts driving the front and rear wheels respectively. Each offset planetary gear reducer enables use of space saving high speed relatively low-torque alternating current electric motors (or other motors with similar performance characteristics) with attendant large speed reductions. Gear reduction enables the production of sufficient torque at the wheels of the vehicle. Applications in addition to utility vehicles are also specifically contemplated.

A utility vehicle drive system comprises two alternating current electric motors (or other high speed motors with similar performance characteristics) each having a shaft driven pinion gear. Intermediate gears engage shaft driven pinion gears which in turn drive planetary gears. Each of the planetary gear reducers include an output spline and each of the output splines are axially aligned with each other.

A method for using a high-speed electric motor (or high-speed hydraulic, pneumatic or direct current motors) in a utility vehicle includes the step of orienting the motors having shaft driven pinion gears side by side such that their shaft driven pinion gears are arranged on opposite sides of the vehicle. Next, the offset planetary gear reducers are mounted in engagement with the shaft driven pinion gears. Each of the planetary gear reducers include a gear driven by the shaft driven pinion gear. The gear driven by the shaft driven pinion gears includes a shaft portion formed as a second pinion sun gear which drives a planetary gear set and carrier. The planetary gear set reacts against a ring gear in the casing of the planetary gear reducer. The carrier of the planetary gear reducer includes a splined output. Each of the splined outputs are on the same axis of the other splined output located on the other side of the vehicle. Additionally, the method includes driving an output shaft coupled to the splined output of the carrier of the planetary gear reducer. And, finally, the method includes driving, with chains, the wheel shafts of the vehicle.

It is an object of the present invention to save motor space in a utility vehicle, recreational vehicle, and the like while providing for high torque at the vehicle wheel and tire.

It is an object of the present invention to provide a planetary gear reducer in a utility vehicle, recreational vehicle and the like which enables use of a smaller, lighter, high speed motor while providing for high torque at the vehicle wheel and tire.

It is an object of the present invention to provide a planetary gear reducer in a utility vehicle, recreational vehicle and the like which enables use of a smaller lighter high speed motor selected from the group of alternating current motors, direct current motors, hydraulic motors, and pneumatic motors.

It is an object of the present invention to provide a planetary gear reducer in a utility vehicle, recreational vehicle and the like which enables use of a smaller, lighter, high speed alternating current electric motor while providing for high torque at the vehicle wheel and tire.

It is an object of the present invention to provide for an efficient planetary gear reducer for use in a utility vehicle, recreational vehicle and the like.

It is an object of the present invention to provide for two offset electric motors in a utility vehicle, recreational vehicle, and the like by utilizing two offset planetary gear reducers.

It is an object of the present invention to utilize high speed alternating current motors in a utility vehicle, recreational vehicle or the like.

It is an object of the present invention to provide a method of using two high speed electric motors.

It is an object of the present invention to provide offset planetary gear reducers for use in combination with high speed motors for efficient use of space in a utility vehicle.

It is an object of the present invention to provide offset planetary gear reducers for use in combination with alternating current electric motors for efficient production of torque at the wheels of a utility vehicle.

These and other objects of the invention will best be understood when reference is made to the Brief Description of the Drawings, Description of the Invention and Claims which follow hereinbelow.

The drawings will be best understood when reference is made to the Description of the Invention and Claims below.

DESCRIPTION OF THE INVENTION

Figure 2:
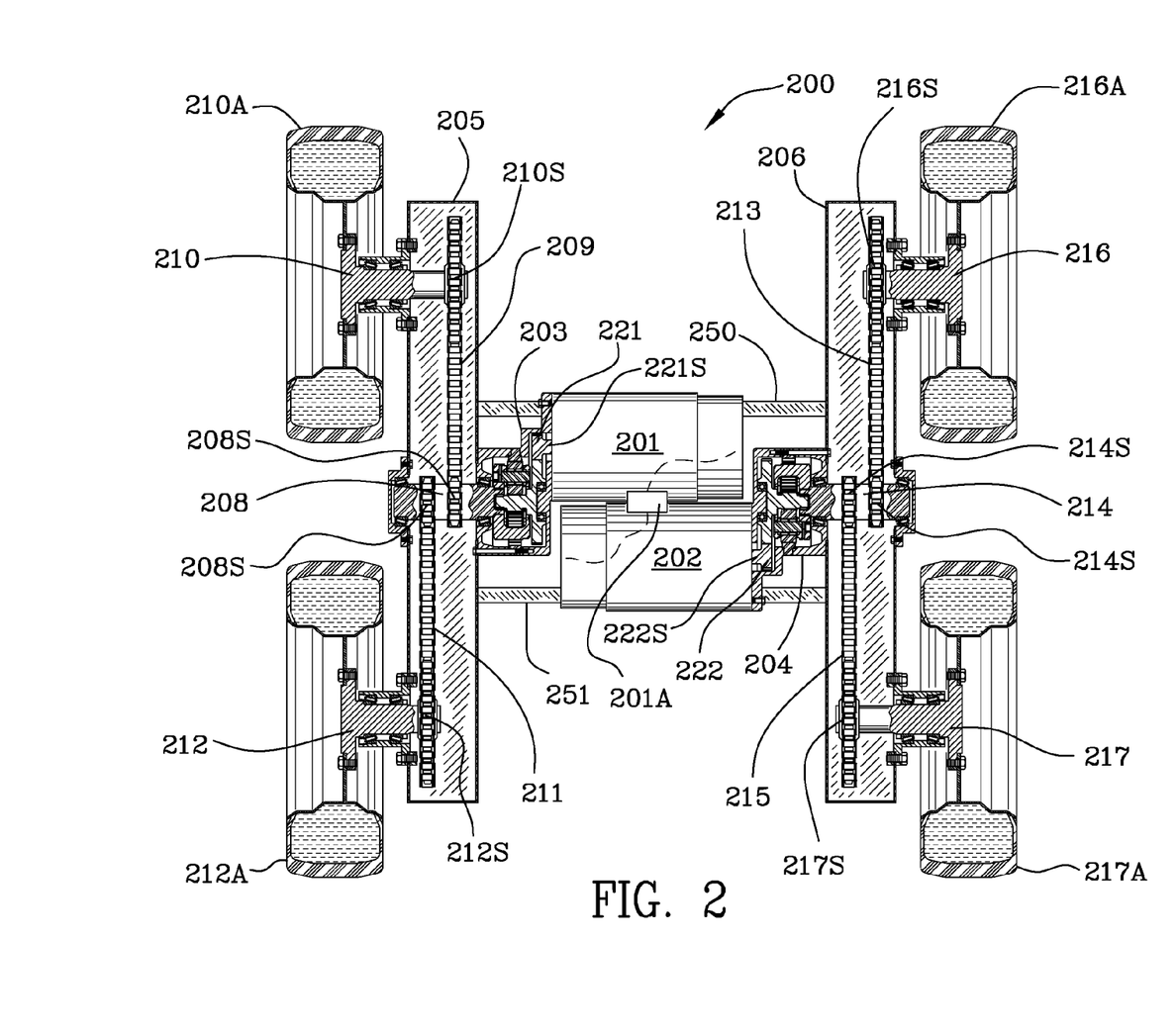
FIG. 2 is a top plan view of the utility vehicle illustrating two alternating current motors oriented side by side with each having an offset planetary gear reducer driving a respective output shaft.

FIG. 2 is a top plan view 200 of the utility vehicle illustrating two alternating current electric motors 201, 202 oriented side by side with each having an offset planetary gear reducer 203, 204 driving a respective output shaft 208, 214. Although reference numerals 201, 202 refer to high speed alternating current electric motors, it is specifically contemplated that other high speed motor types may be used such as direct current motors, hydraulic motors and pneumatic motors.

The utility vehicle includes a frame 205, 206, 250, 251 for supporting vehicle components. As illustrated in FIG. 2, side frame member 205 is on the left hand side of the vehicle and side frame member 206 is on the right hand side of the utility vehicle. The two side frame members 205, 206 are shown in section in FIG. 2, FIG. 2A, and FIG. 2B.

Frame side member 205 supports first chain driven wheel shaft 210. Sprocket 210S is formed as part of the wheel shaft 210 or alternatively is a separate sprocket affixed or attached to the wheel shaft 210. Frame side member 205 also supports the output shaft 208 of the planetary gear reducer 203.

Output shaft 208 includes two sprockets 208S which are identical. The sprockets 208S may be an integral part of shaft 208 or they may be separately attached to the shaft. A metal chain 210 interengages sprockets 210S and 208S and communicates horsepower and torque therebetween. The reduction ratio of output shaft driving sprocket 208S to driven sprocket 210S is approximately 2.5-5:1 such that for every rotation of the output shaft 208 the forward sprocket 210S and wheel shaft 210 turns 0.4 to 0.2 of a turn or revolution. Reduction in speed of the driven sprocket 210S results in a corresponding increase in torque for a given applied power.

Figure 2A:
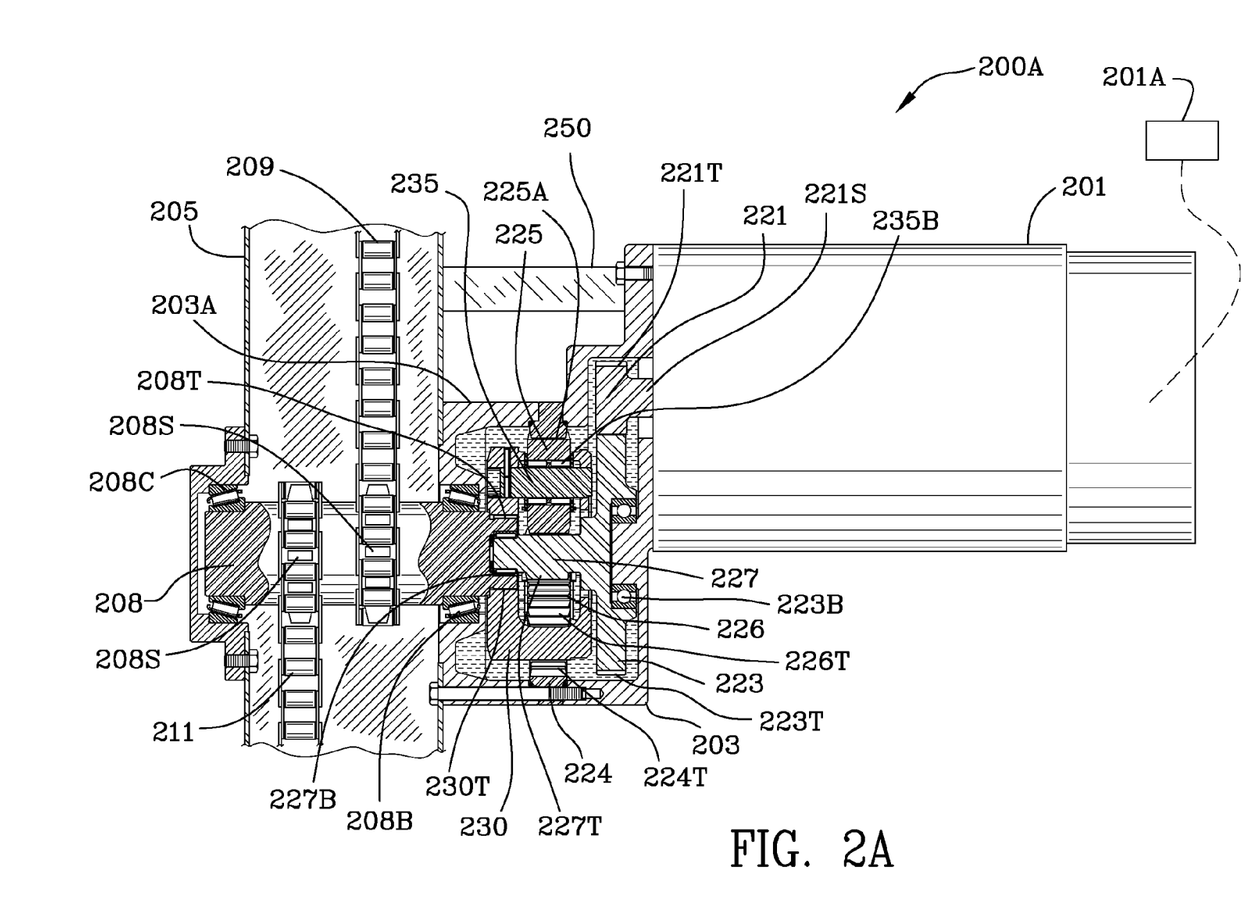
FIG. 2A is an enlarged portion of FIG. 2 illustrating a portion of the left side of the vehicle.
Figure 2B:
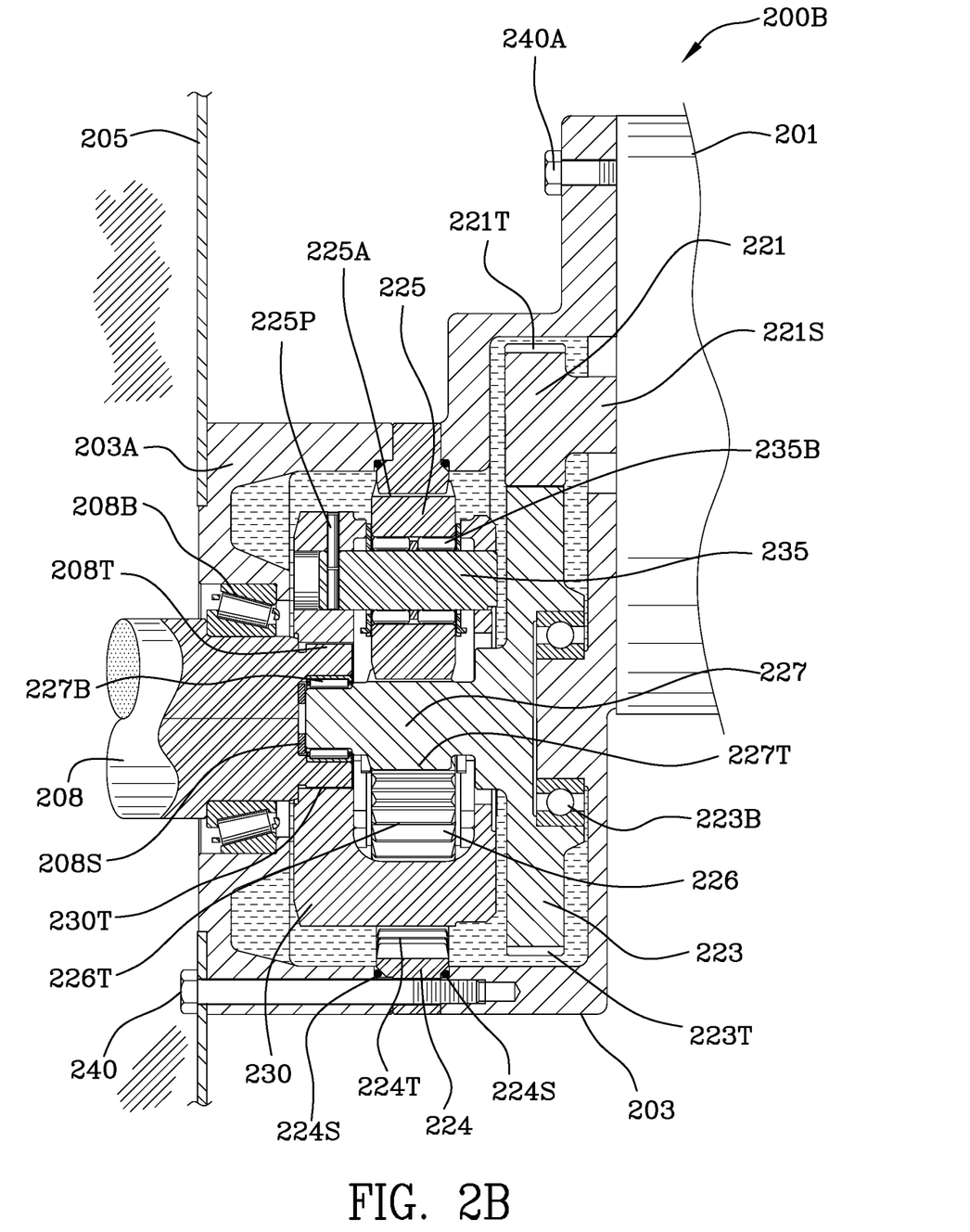
FIG. 2B is an enlarged portion of FIG. 2A illustrating the gear reducer and output shaft.

Referring to FIGS. 2 and 2B, output shaft 208 is splined and is coupled to the splined output 230T of the carrier 230 of the planetary gear reducer 203. Frame side member 205 also supports the second chain driven wheel shaft 212. Sprocket 212S is formed as part of the wheel shaft 212 or alternatively is a separate sprocket affixed or attached to the wheel shaft 212 for driving a rearward wheel 212A.

Metal chain 211 interengages sprockets 212S and 208S and communicates horsepower and torque therebetween. The reduction ratio of the output shaft driving sprocket 208S to driven sprocket 212S is approximately 2.5-5:1 such that for every rotation of the output shaft 208 the rearward sprocket 212S and wheel shaft 212 rotates just 0.4 to 0.2 of a turn or revolution. The reduction in speed of the driven sprocket 212S results in a corresponding increase in torque for a given applied power.

Similarly, the structure and operation of driven sprockets 216S, 217S, shafts 216, 217, frontward and rearward wheels 216A, 217A, sprockets 214S, shaft 214 and chains 213, 215 on the right side and within the right frame 206 are identical to the left frame side member 205 and frame 205. The reduction ratio of the output shaft driving sprocket 214S to driven sprockets 216S, 217S is the same as in connection with the left side of the vehicle, namely, approximately 2.5-5:1.

Speed reduction of approximately 2.5-5:1 just described are in addition to the speed reduction of the planetary gear reducers 203, 204 which are described further herein. Alternating current motors 201, 202 reside side by side and have output shafts 221S, 222S with pinion gears 221, 222 thereon for driving two offset planetary gear reducers 203, 204 to effect speed reduction and increase torque. Alternatively, a helical pinion gear 221H and a helical driven gear 223H. Full load electric motor torque is generally defined as follows:

$$\text{Torque(ft-lbs.)} = 5250 \times \text{horsepower/RPM}$$

Generally, for a given power, high speed electric motors are smaller in size, lighter in weight, and less expensive than low speed motors. Generally, for a given power, alternating current motors are smaller than direct current motors. Additionally, for a given power, alternating current motors are smaller than direct current motors.

Use of planetary gear reducers 203, 204 with alternating current motors 201, 202 saves space. As previously stated the motors may be hydraulic, pneumatic or direct current motors. Reducers 203, 204 are approximately 8 inches in diameter and approximately 5.5 inches deep and occupy a volume of approximately 300 cubic inches.

FIG. 2A is an enlarged portion 200A of FIG. 2 illustrating a portion of the left side of the vehicle and FIG. 2B is a further enlargement of a portion 200B of FIG. 2A illustrating the gear reducer 203 and pinion 221 on output shaft 221S in more detail.

Referring to FIGS. 2 and 2A, the alternating current motors 201, 202 are controlled by a variable frequency drive 201A to control the speed of the motors. Preferably the alternating current motors are three phase motors. Each of the offset planetary gear reducers 203, 204 include a housing having a ring gear 224 affixed thereto. Ring gear 224 is trapped between housing portions 203, 203A of the reducer. Seals 224S prevent leakage of lubricant from within the gear casing.

Each of the planetary gear reducers 203, 204 includes a carrier 230 having planetary gears 225, 226, 229 intermeshing with the ring gear 224 and an output spline 230T. Although the planetary gear reducer illustrated has three planetary gears, any reasonable number of planetary gears may be used. Each of the planetary gear reducers includes a gear 223 having teeth 223T driven by the pinion gear 221 of the output shaft 221 of the alternating current motor 201. The gear 223 driven by the pinion gear 221 of the output shaft 221S of the alternating current motor 201 includes a shaft portion forming a sun pinion 227 with gear teeth 227T.

Sun pinion or gear 227 intermeshes with three planet gears 225, 226, and 229 each of which naturally include teeth 225T, 226T and 229T which intermesh with ring gear 224. Ring gear 224 extends around the inner circumference of the gearbox. Each of the chain drive shafts 208, 214 includes a spline 208T thereon which intermeshes with output spline 230T of the carrier 230 as best viewed in FIG. 2B. Planetary gear reducers 203, 204 effect a speed reduction in the approximate range of between 20-30:1. That is for every revolution of the input pinion gears 221, 222, the carrier 230 will rotate 1/20 to 1/30 of a revolution. Other speed reductions are specifically contemplated. Chain drive sprockets 208S, 214S in combination with wheel shaft sprockets 210S, 212S, 216S and 217S effect a speed reduction in the approximate range of 2.5-5:1. That is, for every one rotation of the chain drive sprocket 208S, the wheel sprockets 210S, 212S will rotate 0.4 to 0.2 of a revolution. Other speed reductions are specifically contemplated. Since torque is inversely proportional to the shaft rotational speed, torque is increased with a reduction in speed.

Other speed reductions are specifically contemplated depending on the desired torque at the wheels and traveling speed of the machine taking loads, inclines and other variables into consideration. Use of the offset speed reducer as disclosed herein enables the efficient use of space and provides the same torque to the wheel with less input torque supplied by the high speed electric motor. The efficiency of the offset speed reducer is approximately 95% at rated load.

Use of the offset speed reducer and electric motors enables use of high speed, light weight electric motors which are smaller in diameter and output less torque than slower, heavier larger motors whether they are alternating current motors or direct current motors. The savings in space, weight and money attained by use of the offset planetary gear reducers with high speed motors is considerable. Use of planetary gear reducers provides a stable transmission of power with torque amplification inversely proportional to the speed reduction. The planetary gear reducers of the instant invention weigh approximately 100 pounds but can vary in weight depending on the materials used such as steel, stainless steel or aluminum. The gears 223, 225, 226, 229 and the carrier 230 are made of steel or stainless steel. Aluminum may be used for the gearbox casing 203, 203A if extremely light weight is desired. The low weight of the gear reducer having a volume of about 300 cubic inches (approx. 8 inches in diameter and 5.5 inches deep) in combination with a light-weight alternating current motor provides a compact low cost arrangement when placed side by side as illustrated in FIG. 2.

Alternating current electric motors 203, 204 are water cooled motors and run at 7,000 to 8,000 RPM. At approximately 7500 RPM the three phase electric motor outputs approximately 14.75 ft-lbs. of torque which equates to approximately 21 horsepower. The peak starting torque is about 77 ft-lbs. The motors to be used are about 14 inches long and 8 inches in diameter and have a volume of approximately 700 cubic inches.

Figure 2C:
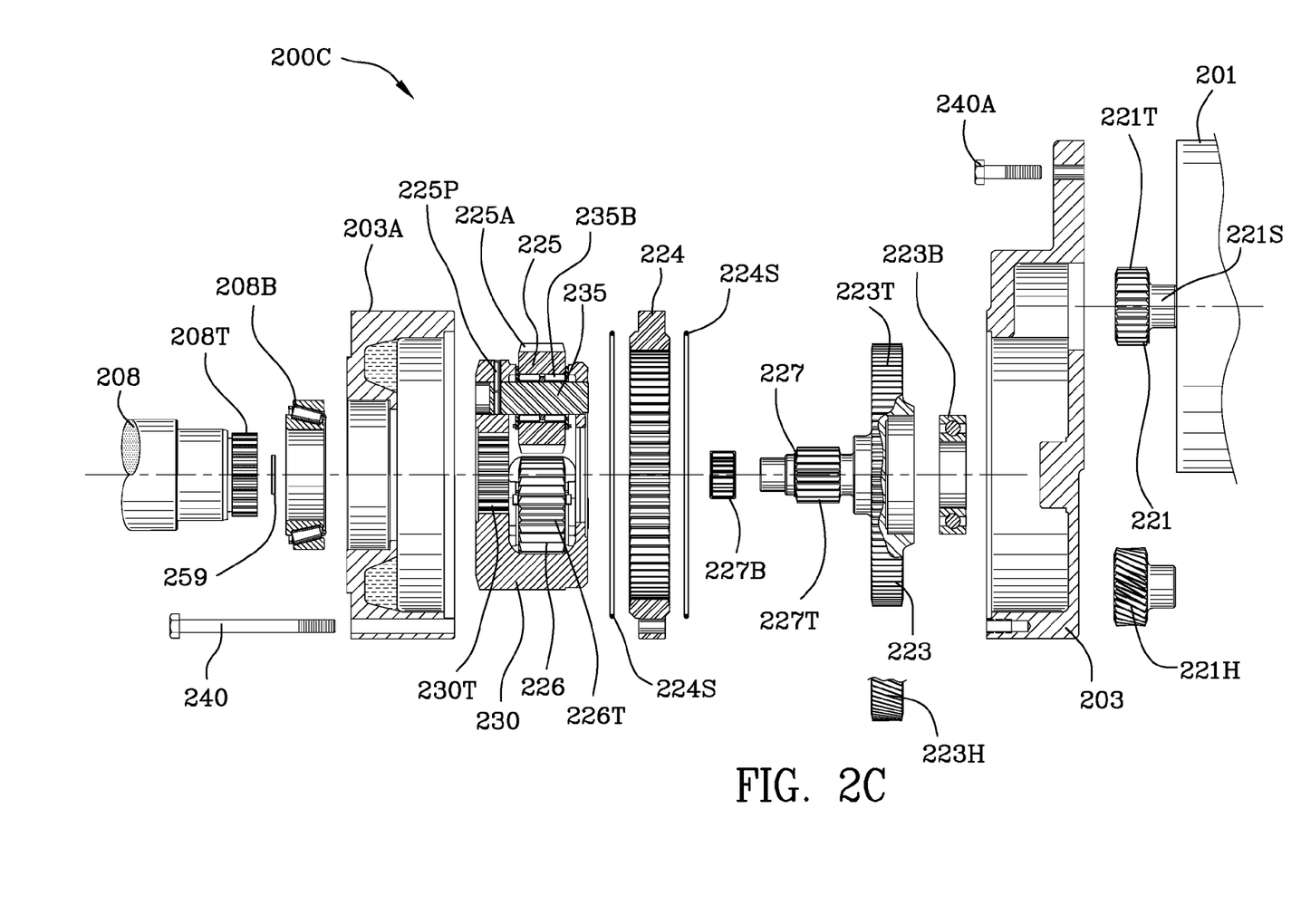
FIG. 2C is an exploded view of the input to the gear reducer, the gear reducer, and the output shaft.

FIG. 2C is an exploded view 200C of the input to the gear reducer 221T, the gear reducer 203, and the output shaft 208. Referring to FIGS. 2B and 2C, sun pinion 227 is supported by bearing 223B and 227B. Use of gear 223 enables the planetary gear reducer to be offset as it is driven by pinion 221 which is on the shaft 221S of the electric motor. Three planet gears 225, 226 and 229 and, more specifically, their teeth 225T, 226T and 229T intermesh with sun pinion teeth 227T and ring gear 234 and its teeth 234T.

Planet gears 225, 226 and 229 are supported by bearings (i.e., 235B) and are pinned to the carrier by pins. See, for example, pin 235 in FIGS. 2A and 2B. Pin 225 P restrains pin 235 from movement within the carrier 230 and thus secures gear 225 in place. Gear 225 and the other planet gears are, of course, free to rotate but they are securely fastened to the carrier and impart rotational motion to the carrier 230. Reference numeral 225A indicates intermeshing between planet gear teeth 225T and ring gear teeth 224T. Referring to FIG. 2A, output shaft 208 is supported by bearings 208B and 208C and intermeshes its spline 208T with spline 230T of the carrier.

Planetary gear reducer 203 distributes the load evenly to three planets, 225, 226 and 229. As previously indicated any reasonable number of planet gears from 1 to "n" may be used. Reciting the operation of the gear reducer, torque is applied by shaft 221S through teeth 221T of pinion 221 which imparts rotational movement and torque to gear 223. Gear 223 includes sun pinion 227 which by and through its teeth 227T imparts rotational movement and torque to gears 225, 226 and 229 via teeth 225T, 226T and 229T. As previously stated planet gears 225, 226 and 229 are free to rotate and impart rotational movement to carrier 230 effecting a speed reduction which is transmitted to output shaft 208 which is interconnected with the carrier spline 230T. The gearbox 203, 203A is separable into two portions 203 and 203A and they trap ring gear 224 when the gearbox is secured by fastener 240A to the electric motor 201 and when the portions 203, 203A are secured together by fastener 240.

Figure 2D:
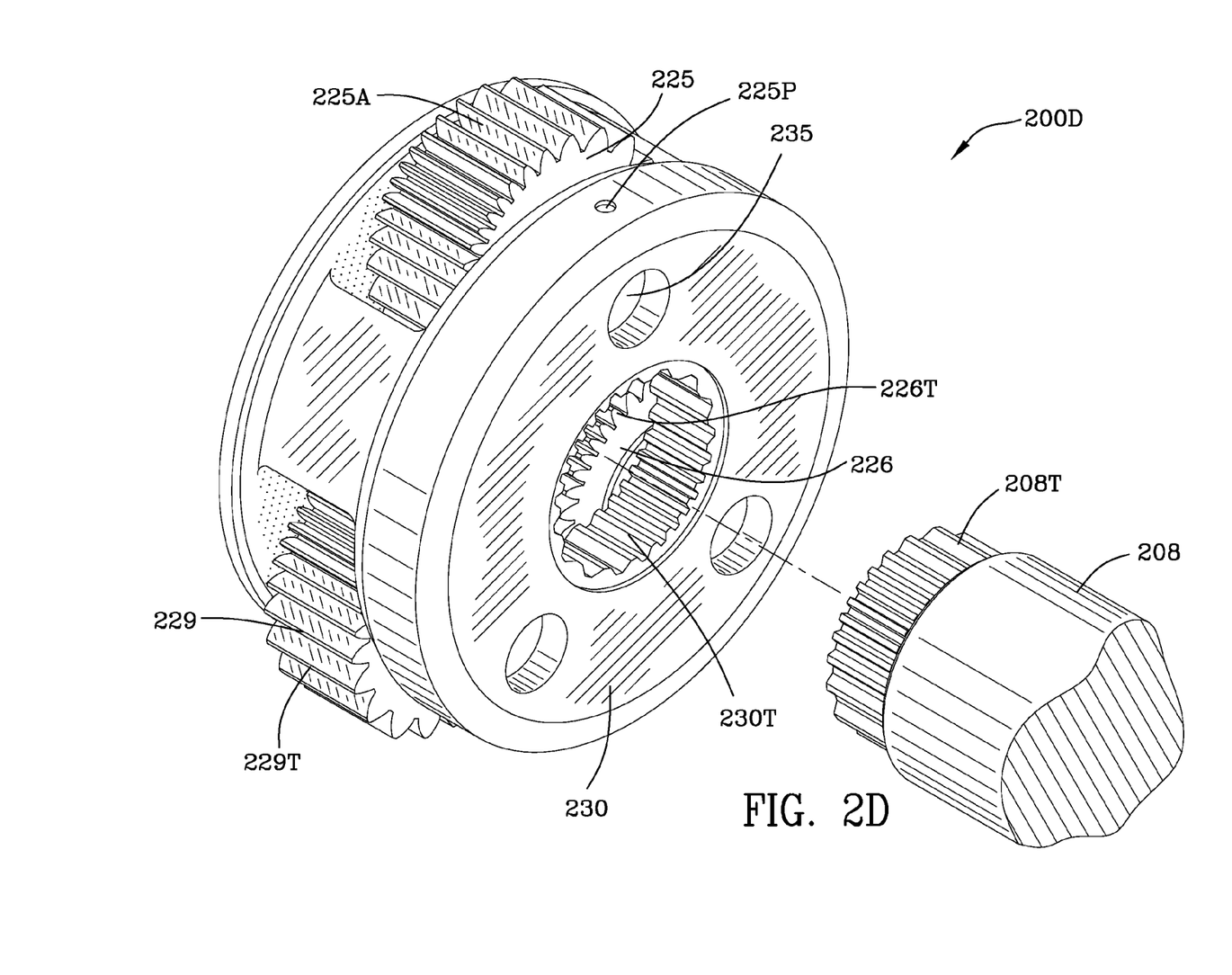
FIG. 2D is a perspective view of the carrier and the output shaft.
Figure 2E:
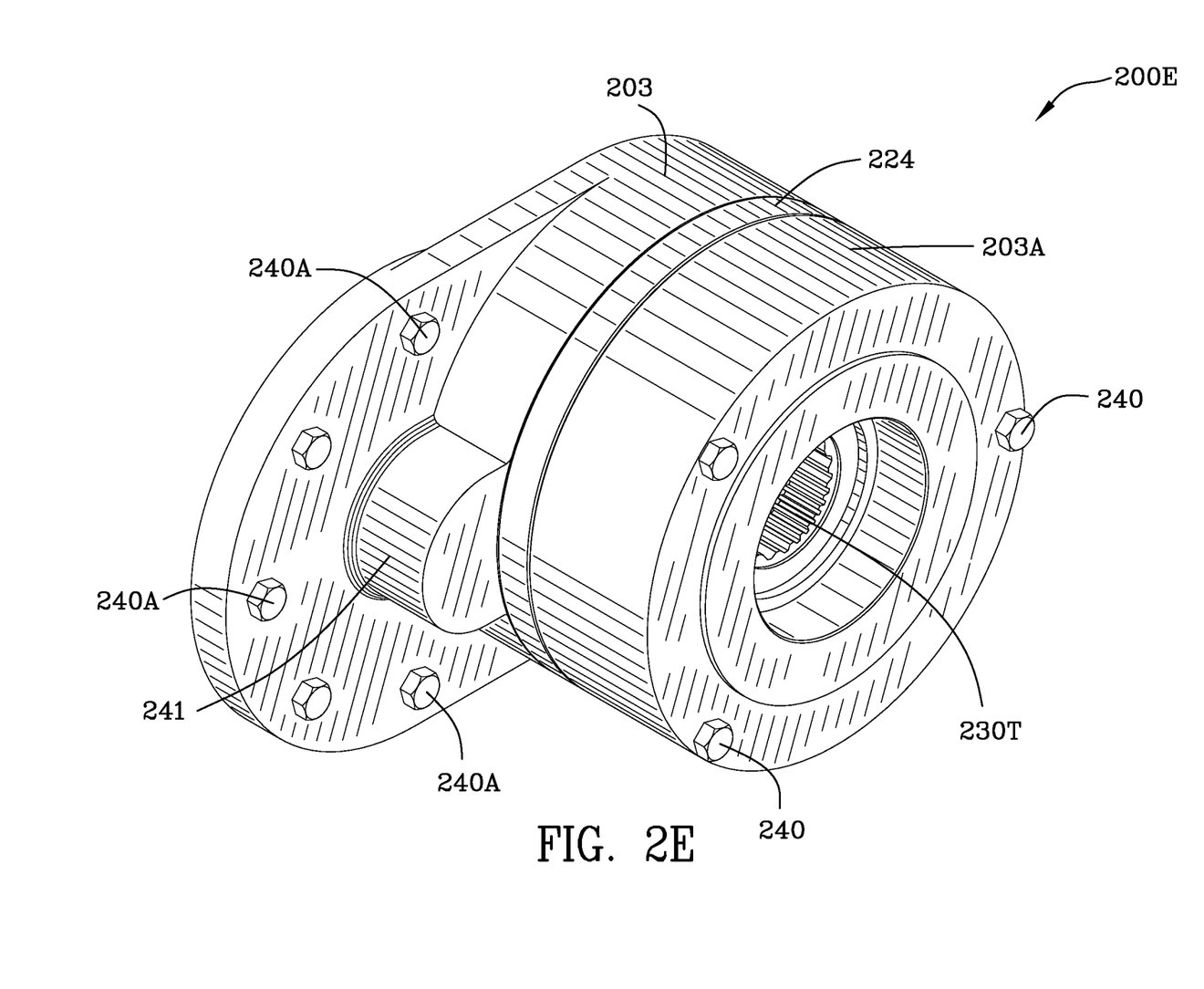
FIG. 2E is a perspective view of the offset planetary gear speed reducer.

FIG. 2D is a perspective view 200D of the carrier 203, 203A, planet gears 229 and 225, and output shaft 208 with a corresponding spline 208T. FIG. 2E is a perspective view 200E of the offset planetary gear reducer without bearing 208B illustrated therein. The principal dimensions of the offset planetary gear reducer are approximately 8 inches in diameter and 5.5 inches deep neglecting the input housing 241 which houses pinion 221. The offset planetary gear reducer is generally cylindrically shaped and includes a housing 241 for the shaft driven pinion gear 221. A flange (unnumbered) is fastened to the motor 201.

Figure 3:
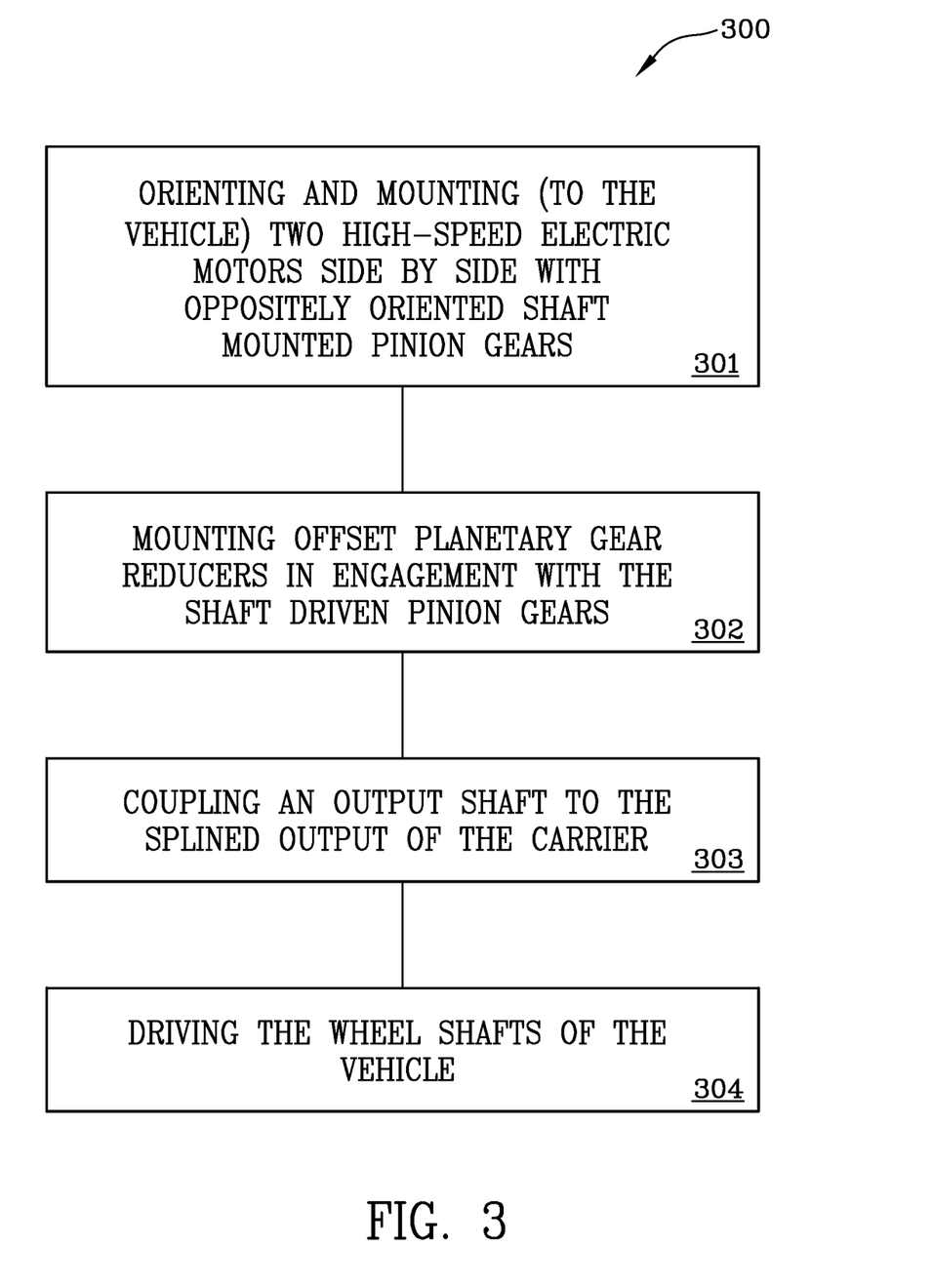
FIG. 3 is a block diagram of the method for using high speed alternating current electric motors with offset planetary gear reducers.

FIG. 3 is a block diagram 300 illustrating a method for using high-speed electric motors in combination with offset planetary gear reducers in a utility vehicle. The first step includes orienting two high speed electric motors having shaft driven pinion gears side by side 301 such that their shaft driven pinion gears are arranged on opposite sides of the vehicle. Next, the method includes mounting offset planetary gear reducers in engagement with the shaft driven pinion gears 302. Each of the planetary gear reducers 203, 204 include a gear driven by the shaft driven pinion gears 221, 222. The gear driven by the shaft driven pinion gears includes a shaft portion formed as a sun pinion gear 227 which drives a planetary gear set and carrier 230 reacting against a ring gear 224 in the casing of the planetary gear reducer 203, 203A. The carrier 230 of the planetary gear reducer includes a splined output 230T and each of the splined outputs 230T are on the same axis. The method further includes driving an output shaft 208, 214 coupled to the splined output 230T of the planetary gear reducer. Finally, the method includes driving, with chains (209, 211, 213, 215), the wheel shafts (210, 212, 216, 217) of the vehicle.

A list of reference numerals follows.

REFERENCE NUMERALS

14*a-d*—tires of vehicle
28—battery
60, 64—motor
62, 66—sides of vehicle
68, 84—coupling
70, 82—spur gear reduction assembly
72, 86—chain
74, 76, 88, 90—gears
78, 80, 92, 94—axles
70, 82—spur gear reduction assembly
100—prior art utility vehicle
200—utility vehicle
200A—enlarged portion of utility vehicle
200B—further enlargement of planetary gear reducer
200C—exploded view of powertrain
200D—perspective exploded view of carrier and output shaft
200E—perspective view of offset planetary gear reducer
201, 202—alternating current motor
203, 203A, 204—gearbox
205, 206—vehicle side wall
208, 214—output shafts
208B, 223B, 227B, 235B, 208C—bearing
208T—spline on output shaft
209, 211, 213, 215—drive chains
210, 212, 216, 217—wheel shaft
210A, 212A, 216A, 217A—wheel tire
221T—pinion teeth
221, 222—motor shaft pinion gear
221H—helical pinion
221S, 222S—motor shaft
223—gear
223H—helical gear
223B—bearing
223T—teeth on gear
224—stationary ring gear
224T—ring gear teeth
224S, 259S—seal 225, 226, 229—planet gear
225A—mesh between planet gear teeth 223T and ring gear teeth 224T
225P—pin
225T, 226T, 229T—planet gear teeth
227—sun pinion
227T—sun gear teeth
230—carrier
230T—spline on carrier
235—pin
240, 240A—bolt
241—pinion housing
250, 251—frame member
300—block diagram of method of using high speed motor and offset planetary gear reducers
301—orienting and mounting high speed motors side by side with pinions oppositely arranged
302—mounting offset planetary gear reducer in engagement with the shaft driven pinion gears
303—coupling an output shaft to the spined output at a desired rate
304—driving the wheel shifts of the vehicle The invention has been set forth by way of example with particularity. Those skilled in the art will readily recognize that changes may be made to the invention without departing from the spirit and the scope of the claimed invention.

The invention claimed is:

1. A wheel driven utility vehicle comprising:
a frame;
a high speed motor having an output shaft with a gear thereon;
an offset planetary gear reducer driven by said output shaft of said gear of said high speed motor and affixed thereto;
said offset planetary gear reducer includes an output carrier interconnected with an output shaft;
said output shaft includes first and second chain drive sprockets;
forward and rearward wheel shafts each having a wheel sprocket;
a first and second chain;
said first chain interengaging said first chain drive sprocket and said forward wheel sprocket driving said forward wheel shaft; and,
said second chain interengaging said second chain drive sprocket and said rearward wheel sprocket driving said rearward wheel shaft.

2. A wheel driven utility vehicle as claimed in claim 1 wherein said motor is an alternating current motor controlled by a variable frequency alternating current drive.

3. A wheel driven utility vehicle as claimed in claim 1 wherein said planetary gear reducer is in the range of 20:1 to 30:1.

4. A wheel driven utility vehicle as claimed in claim 1 wherein said forward and rearward wheel sprockets are larger diameter than said first and second chain drive sprockets of said output shaft effecting a gear reduction in the range of approximately 2.5 to 5:1.

5. A wheel driven utility vehicle as claimed in claim 1 wherein said high-speed motor is a hydraulic motor.

6. A wheel driven utility vehicle as claimed in claim 1 wherein said high-speed motor is a pneumatic motor.

7. A wheel driven utility vehicle as claimed in claim 1 wherein said high-speed motor is a direct current motor.

8. A wheel driven utility vehicle as claimed in claim 1 wherein said output carrier includes an internal spline, said output shaft includes an external spline, said internal spline of said output carrier drives said external spline of said output shaft.

9. A wheel driven utility vehicle as claimed in claim 2 wherein said alternating current electric motor operates at full load between 7-8,000 rpm outputting approximately 14.75 ft-lbs. of torque.

10. A wheel driven utility vehicle as claimed in claim 9 wherein said first and second drive sprockets and said first and second wheel sprockets each have a reduction in the range of 2.5 to 5:1.

* * * * *

UNITED STATES PATENT AND TRADEMARK OFFICE
CERTIFICATE OF CORRECTION

PATENT NO. : 8,561,732 B2  
APPLICATION NO. : 13/153440  
DATED : October 22, 2013  
INVENTOR(S) : Schoon Page 1 of 1

It is certified that error appears in the above-identified patent and that said Letters Patent is hereby corrected as shown below:

In the Specification

Col. 5, line 38, after "sprocket" delete "2085" and insert --208S-- therefor.

Col. 5, line 46, delete "216S, 217S," and insert --216S, 217S,-- therefor.

Col. 6, line 50, after "sprockets" delete "210S, 212S" and insert --210S, 212S-- therefor.

Signed and Sealed this  
Twenty-fourth Day of December, 2013

Margaret A. Focarino  
*Commissioner for Patents of the United States Patent and Trademark Office*